United States Patent [19]

Ushiro

[11] Patent Number: 4,953,427
[45] Date of Patent: Sep. 4, 1990

[54] VEHICLE SPEED CONTROL SYSTEM

[75] Inventor: Kenzo Ushiro, Sakai, Japan

[73] Assignee: Kubota Ltd., Japan

[21] Appl. No.: 399,170

[22] Filed: Aug. 28, 1989

[30] Foreign Application Priority Data

Aug. 31, 1988 [JP] Japan ................... 63-218859

[51] Int. Cl.⁵ .............................. B60K 41/12
[52] U.S. Cl. ................................. 74/872
[58] Field of Search ..................... 74/872, 879

[56] References Cited

U.S. PATENT DOCUMENTS 2,101,275 12/1937 Starkey .................. 74/872 X
4,077,283 3/1978 Hammond ............... 74/872 X
4,716,788 1/1988 Kita ........................ 74/872 X

FOREIGN PATENT DOCUMENTS 0070735 5/1982 Japan ..................... 74/872
57-103235 6/1982 Japan .
61-16623 1/1986 Japan .

Primary Examiner—Dirk Wright
Attorney, Agent, or Firm—Webb, Burden, Ziesenheim & Webb

[57] ABSTRACT

A speed control system for a working vehicle having a stepless change speed device and an auxiliary change speed device. The speed control system comprises a speed governor for controlling rotational rate of an engine, and an accelerator lever for operating the speed governor. The speed governor is interlocked with the stepless change speed device such that the rotational rate of the engine is increased with an accelerating operation of the stepless change speed device, and is decreased with a decelerating operation of the stepless change speed device. An interlock breaker is provided for breaking the interlocking between the speed governor and stepless change speed device when the auxiliary change speed device is in a low speed state.

4 Claims, 4 Drawing Sheets

VEHICLE SPEED CONTROL SYSTEM

BACKGROUND OF THE INVENTION

1. Field of the Invention

The present invention relates to a speed control system for a vehicle, particularly a tractor, having a propelling system driven by an engine, the propelling system including a stepless change speed device and an auxiliary change speed device connected in series.

2. Description of the Prior Art

A known speed control system of this type includes a hand accelerator lever for operating a speed governor to control rotational rate of the engine, and a foot pedal for operating a change speed lever connected to the stepless change speed device. Generally, running speed of the vehicle is controlled by depressing the foot pedal with the hand accelerator lever maintained in a selected control position to maintain the rotational rate of the engine constant. The auxiliary change speed device is used to produce high-speed and low-speed states in accordance with working conditions and running conditions. The auxiliary change speed device itself is controlled entirely independently of the controls of the stepless change speed device and the rotational rate of the engine.

The feature that the rotational rate of the engine is maintained constant, regardless of operations of the stepless change speed device and auxiliary change speed device, by maintaining the hand accelerator lever in a selected control position, is very useful in that a working implement such as a rotary plow can be driven at a constant rate despite changes in the vehicle running speed during a field operation. This feature, however, is inconvenient for road running of the vehicle.

That is, for high speed road running, it is necessary to maintain the engine at or adjacent a maximum rotational rate. On the other hand, the vehicle must be stopped and started relatively frequently during road running, such as at intersections and traffic lights. For stopping the vehicle, the stepless change speed device is returned to neutral but this is not sufficient. Although the vehicle stops, the engine keeps rotating at a high rate and producing great noise. It is therefore necessary to return the hand accelerator lever to an idling position, which gives the driver an additional step of operation. For starting the vehicle, the hand accelerator lever must be placed in or adjacent a maximum speed position again, to further increase the number of operating steps.

SUMMARY OF THE INVENTION

An object of the present invention is to improve operability, with respect to road running, of the speed control system of the type noted in the introduction hereof. In particular, the invention intends to simplify the speed control operation during road running by relating the change speed state of the stepless change speed device to the rotational rate of the engine.

The above object is achieved, according to the present invention, by a speed control system for a vehicle having an engine, a stepless change speed device for receiving output of the engine, and an auxiliary change speed device for transmitting output of the stepless change speed device in a plurality of speeds to rear wheels, the speed control system comprising means to interlock the stepless change speed device with an accelerator lever which operates a speed governor for controlling rotational rate of the engine. This interlocking means is operable such that the rotational rate of the engine is increased with an accelerating operation of the stepless change speed device through the speed governor, and is decreased with a decelerating operation of the stepless change speed device through the speed governor. The speed control system further comprises an interlock breaker for prohibiting the interlocking means from interlocking the speed governor and the stepless change speed device when the auxiliary change speed device is in a low speed state.

With the above speed control system, operational running and road running are distinguishable by the change speed state of the auxiliary change speed device since, for example, the auxiliary change speed device is operated to a low speed state during an operational run at which the vehicle for the most part runs at low speed, and is operated to a high speed state during road running which requires speed. The speed governor for controlling the rotational rate of the engine is interlocked with the stepless change speed device such that the rotational rate of the engine is increased with an accelerating operation of the stepless change speed device, and is decreased with a decelerating operation of the stepless change speed device. During road running, therefore, the vehicle may be driven at high speed, and may be stopped by reducing the rotational rate of the engine to an idling level without operating the accelerator lever. When the auxiliary change speed device is in the low speed state, the interlocking between the stepless change speed device and speed governor is broken to render the stepless change speed device and speed governor independently operable. Thus, during an operational run, the running speed may be controlled with the rotational rate of the engine maintained constant.

According to the present invention, a single operation of the stepless change speed device realizes excellent road running which requires high speed as well as stopping with suppressed engine noise, while retaining excellent operability during an operational run.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
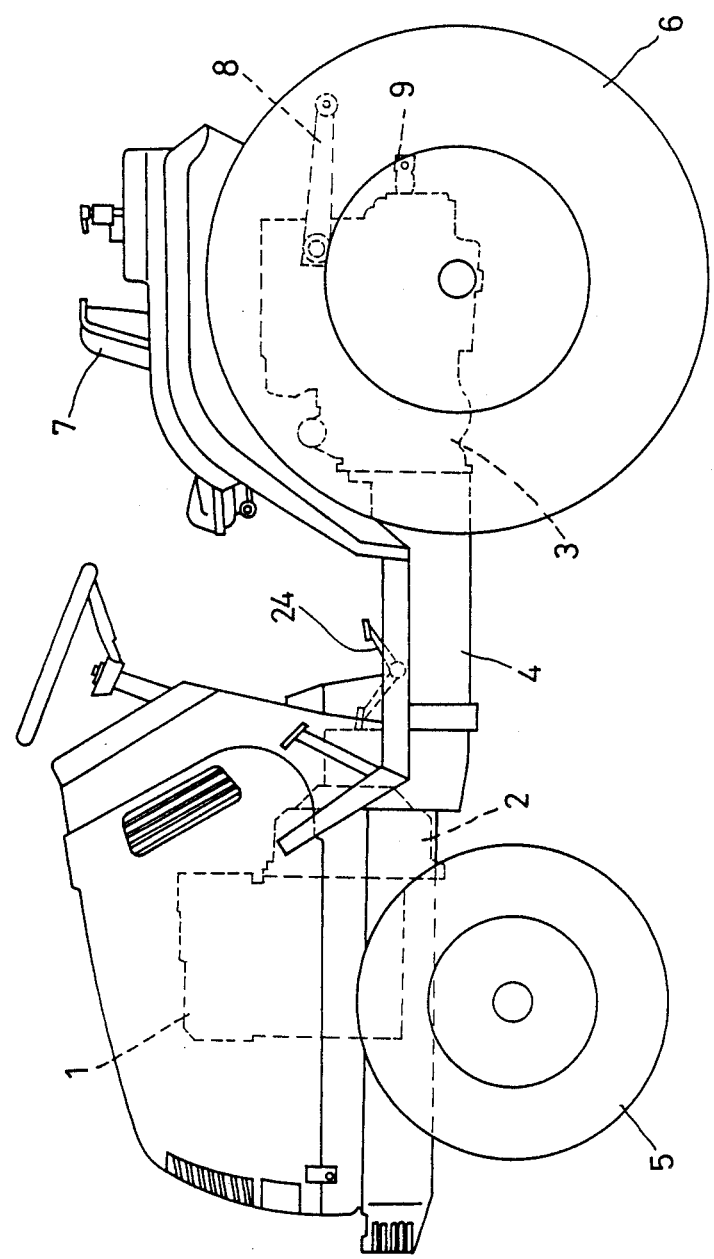
FIG. 1 is a side elevation of a tractor employing a speed control system according to the present invention.

The present invention will be described hereinafter as applied to a riding type agricultural tractor. As shown in FIG. 1, this tractor comprises an engine 1, a clutch housing 2 connected to the engine 1, and a rear transmission case 3 connected through an intermediate case 4 to the clutch housing 2. The tractor further comprises steerable front wheels 5, rear drive wheels 6, a driver's seat 7, a lift arm 8 for connection to a working implement, and a PTO shaft 9 for driving the working implement.

Figure 2:
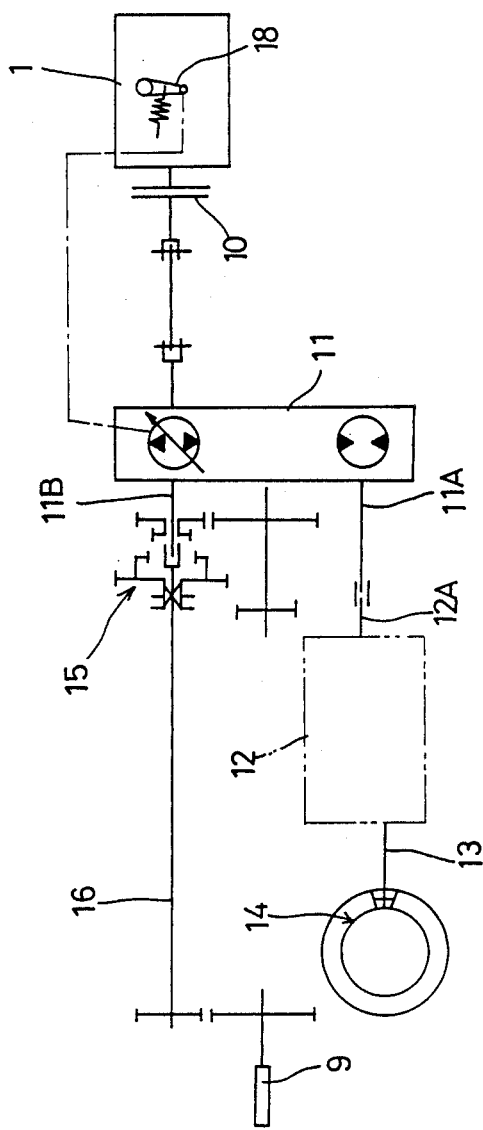
FIG. 2 is a diagram of a drive transmission structure of the tractor.

Referring to FIG. 2, a propelling transmission system includes a reversible hydrostatic transmission 11 operatively connected to the engine 1 through a main clutch 10. The hydrostatic transmission 11 has a motor output shaft 11A connected to an input shaft 12A of a hydraulic clutch type auxiliary change speed gear device 12 which provides three, i.e. high, intermediate and low, speeds. The auxiliary change speed device 12 has an output shaft 13 operatively connected through a differential 14 to the rear wheels 6.

A transmission system leading to the PTO shaft 9 includes a pump drive shaft 11B extending from the hydrostatic transmission 11 to a PTO change speed device 15. A PTO transmission shaft 16 extends from the change speed device 15 to be operatively connected to the PTO shaft 9.

Figure 3:
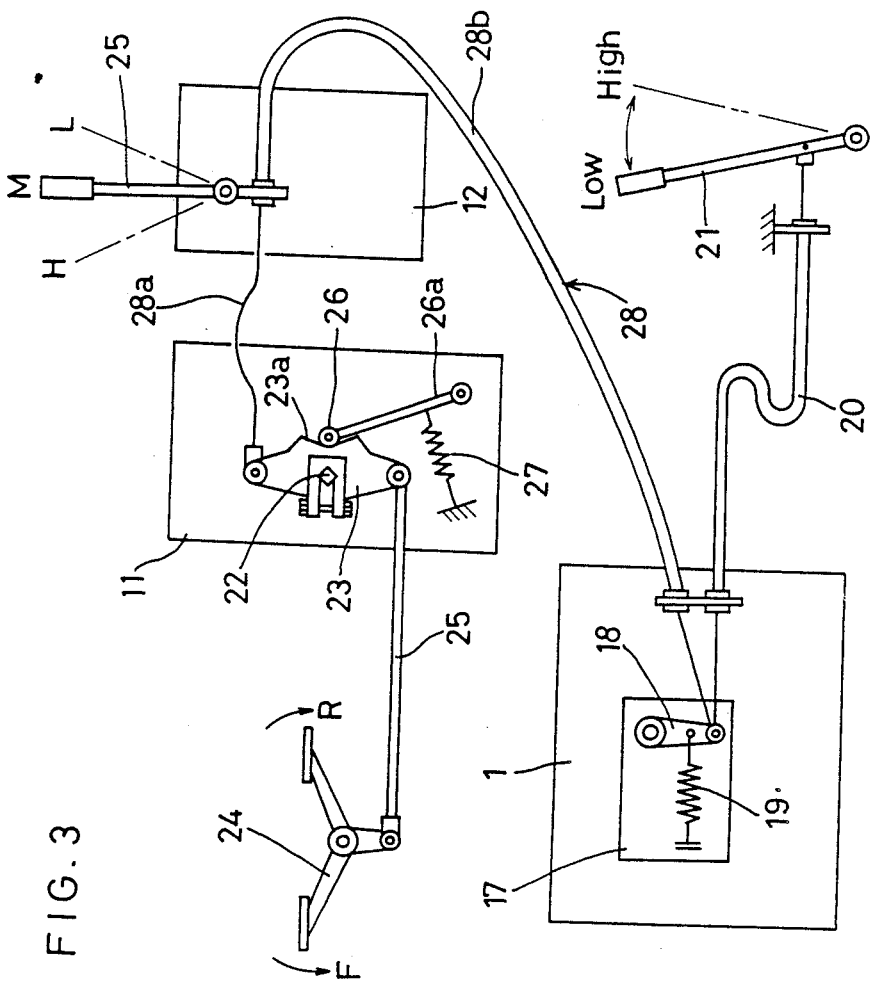
FIG. 3 is a diagram of the speed control system.

Referring to FIG. 3, the tractor comprises a speed control system including a hand accelerator lever 21, a foot pedal 24 and an auxiliary change speed lever 25. The hand accelerator lever 21 is lockable to a selected control position for operating a speed governor 17 which controls rotational rate of the engine 1. The foot pedal 24 is operable to control the hydrostatic transmission 11. The auxiliary change speed lever 25 is operable to control the auxiliary change speed device 12. The speed control system further includes devices for interlocking these components.

The interlocking device between the speed governor 17 and hand accelerator lever 21 includes a spring 19 acting on a control lever 18 of the speed governor 17 to urge the governor 17 to an idling position, and a release wire 20 for operatively connecting the control lever 18 to the hand accelerator lever 21.

The interlocking device between the hydrostatic transmission 11 and foot pedal 24 includes a change speed arm 23 secured to an end of a support shaft (trunnion shaft) 22 of a swash plate projecting outwardly of a housing of the hydrostatic transmission 11. One end of the change speed arm 23 is connected through a rod 25 to the foot pedal 24. The change speed arm 23 defines a V-shaped cam surface 23a, and a roller 26 is urged by a spring 27 to contact the cam surface 23a for maintaining the change speed arm 23 in a neutral position. The hydrostatic transmission 11 is steplessly changeable between a forward drive state and a backward drive state across neutral by depressing the foot pedal 24 forward (F) and rearward (R).

A further interlocking device causes the speed governor 17 to increase the rotational rate of the engine 1 with an accelerating operation of the hydrostatic transmission 11, and to decrease the rotational rate of the engine 1 with a decelerating operation of the hydrostatic transmission 11. Specifically, a release wire 28 is provided for operatively connecting the change speed arm 23 to the control lever 18. Further, an interlock breaker is provided which permits this interlocking device to operate only when the auxiliary change speed device 12 provides the high speed, breaking the interlock when the auxiliary change speed device 12 provides the low speed.

More particularly, the release wire 28 has an outer wire 28b connected at one end thereof to the auxiliary change speed lever 25. When the auxiliary change speed lever 25 is in a high speed position H, the release wire 28 is in an interlocking state with its inner wire 28a in tension. When the auxiliary change speed lever 25 is operated to an intermediate position M and a low speed position L, the release wire 28 is in a non-interlocking state with the inner wire 28a relaxed.

When the tractor moves from one field to another or on the road, the hand accelerator lever 21 may be set to a position for low rate rotation, with the auxiliary change speed lever 25 operated to the high speed position H. When in this state the foot pedal 24 is depressed forward (F), the interlocking device increases rotational rate of the engine 1, thereby accelerating the tractor. When the foot pedal 24 is returned to neutral, the rotational rate of the engine 1 decreases to stop the vehicle. This interlocking does not operate when the foot pedal 24 is depressed rearward (R).

When the auxiliary change speed lever 25 is operated to place the auxiliary change speed device 12 in the intermediate or low speed state, the inner wire 28a of the release wire 28 is relaxed to provide play. As a result, the interlocking between the foot pedal 24 and control lever 18 is broken, and the control lever 18 is operable only by the hand accelerator lever 21 for setting the rotational rate of the engine 1.

In the above embodiment, the rotational rate of the engine 1 is automatically variable only in the forward change speed range of the foot pedal 24. Alternatively, the inner wire 28a of the release wire 28 may be connected to a support arm 26a of the neutralizing roller 26. Then the inner wire 28a is pulled by the support arm 26a oscillatable in the same direction whether the change speed arm 23 is operated forward or backward, thereby to operate the control lever 18 toward the high rate engine rotation.

Figure 4:
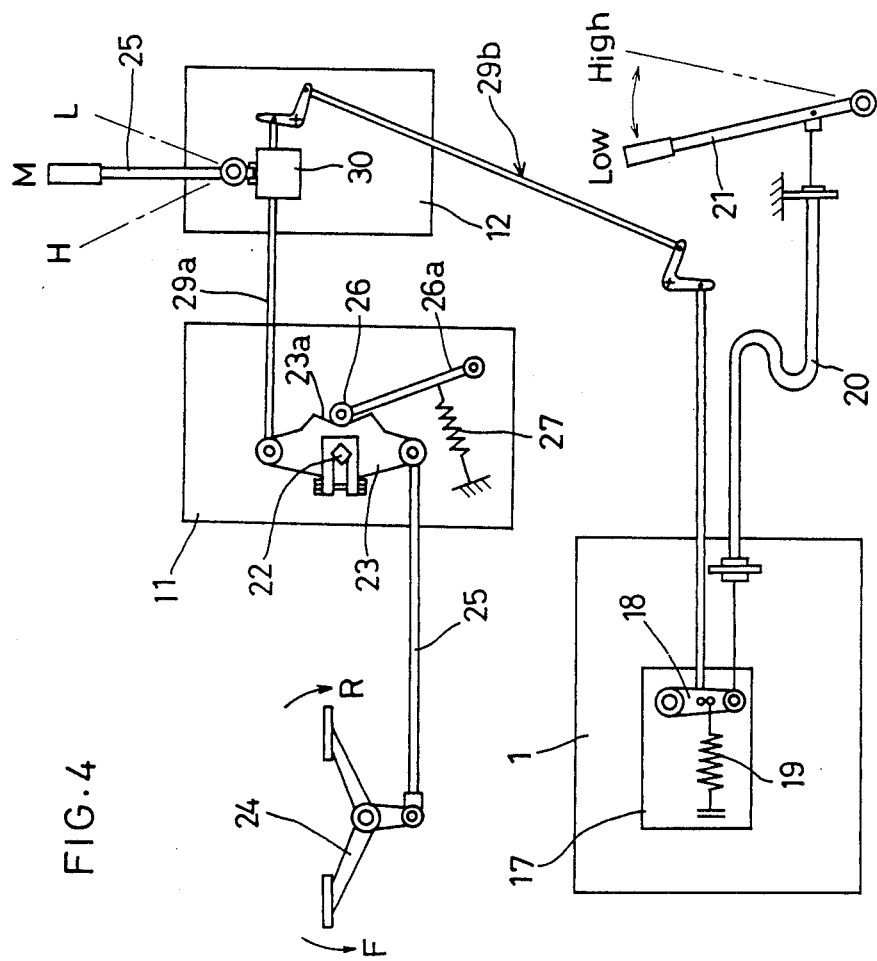
FIG. 4 is a diagram of a modified speed control system.

As shown in FIG. 4, the interlocking device may comprise a link mechanisms 29a and 29b, with the interlock breaker comprising a clutch 30 disposed between the link mechanisms 29a and 29b to be operable by the auxiliary change speed lever 25. In this case, the clutch 30 operatively interconnects the link mechanisms 29a and 29b, thereby interlocking the foot pedal 24 and control lever 18, only when the auxiliary change speed lever 25 is in the high speed position H. Like parts in FIG. 4 labeled with like reference numerals with respect to FIG. 3 perform the same functions and are not described again to avoid unnecessary repetition.

It is possible within the scope of the present invention to provide the interlocking device and interlock breaker by means of electric control.

What is claimed is:

1. A speed control system for a vehicle having an engine, a stepless change speed device for receiving output of the engine, and an auxiliary change speed device for transmitting output of the stepless change speed device in a plurality of speeds to rear wheels, said speed control system comprising;

a speed governor for controlling rotational rate of the engine, an accelerator lever for operating said speed governor, interlocking means for interlocking said speed governor and said stepless change speed device such that the rotational rate of the engine is increased with an accelerating operation of said stepless change speed device through said speed governor, and is decreased with a decelerating operation of said stepless change speed device through said speed governor, and interlock breaker means for prohibiting said interlocking means from interlocking said speed governor and said stepless change speed device when said auxiliary change speed device is in a low speed state.

2. A change speed system as claimed in claim 1, wherein said stepless change speed device is a hydrostatic transmission, said interlocking means comprising a connecting strip having one end thereof connected to a change speed lever attached to a swash plate trunnion shaft of said hydrostatic transmission, and the other end connected to a control lever of said speed governor.

3. A change speed system as claimed in claim 2, wherein said interlock breaker means comprises clutch means provided for said connecting strip to break a push-pull operation of said connecting strip.

4. A change speed system as claimed in claim 2, wherein said connecting strip comprises a release wire including an inner wire having one end thereof connected to said change speed lever, and the other end connected to said control lever, and an outer wire having one end thereof connected to a change speed arm of said auxiliary change speed device, and the other end secured immovable, said release wire being in a non-interlocking state with said inner wire relaxed when said change speed arm is in a low speed position, and said release wire being in an interlocking state with said inner wire in tension when said change speed arm is in a high speed position.

* * * * *